(12) United States Patent
Eriksson et al.

(10) Patent No.: US 10,917,817 B2
(45) Date of Patent: Feb. 9, 2021

(54) METHODS AND APPARATUS FOR DISCARDING PACKETS IN A WIRELESS COMMUNICATION NETWORK (71) Applicant: Telefonaktiebolaget LM Ericsson (publ), Stockholm (SE)

(72) Inventors: Anders K Eriksson, Uppsala (SE); Mattias Bergström, Sollentuna (SE); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 221 days.

(21) Appl. No.: 16/061,463

(22) PCT Filed: Apr. 26, 2018

(86) PCT No.: PCT/SE2018/050430
§ 371 (c)(1),
(2) Date: Jun. 12, 2018

(87) PCT Pub. No.: WO2018/212695
PCT Pub. Date: Nov. 22, 2018

(65) Prior Publication Data
US 2020/0084668 A1 Mar. 12, 2020

Related U.S. Application Data (60) Provisional application No. 62/507,439, filed on May 17, 2017.

(51) Int. Cl.
*H04W 28/14* (2009.01)
*H04L 12/853* (2013.01)
(Continued)

(52) U.S. Cl.
CPC ......... *H04W 28/14* (2013.01); *H04L 47/2416* (2013.01); *H04L 47/28* (2013.01); *H04L 47/32* (2013.01)

(58) Field of Classification Search
None
See application file for complete search history.

(56) References Cited

U.S. PATENT DOCUMENTS 7,813,348 B1 * 10/2010 Gupta .................. H04L 47/10
370/394
8,855,047 B2 10/2014 Sammour et al.
(Continued)

FOREIGN PATENT DOCUMENTS

EP 2329624 B1 11/2012

OTHER PUBLICATIONS

3GPP, "3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.1.0, Dec. 2016, 1-39.
(Continued)

*Primary Examiner* — Alex Skripnikov
(74) *Attorney, Agent, or Firm* — Murphy, Bilak & Homiller, PLLC (57) ABSTRACT One aspect of the disclosure provides a method for a wireless communications network. The method comprises obtaining a first data unit for storage in a packet queue; determining a type of data carried by the first data unit; and re-determining timer values for respective discard timers associated with the one or more data units stored in the packet queue. The timer values are re-determined as a function of the determined type of data carried by the first data unit.

20 Claims, 6 Drawing Sheets (51) Int. Cl.
    *H04L 12/841*     (2013.01)
    *H04L 12/823*     (2013.01)

(56) References Cited

U.S. PATENT DOCUMENTS

2002/0048277 A1    4/2002   Bennett
2019/0166059 A1*   5/2019   Lee .................. H04L 47/32

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.1.0, Dec. 2016, 1-654.
Bormann, C. et al., "RObust Header Compression (ROHC): Framework and four profiles: RTP, UDP, ESP, and uncompressed", Network Working Group, RFC 3095, Jul. 2001, 1-168.
Unknown, Author, "LTE; Evolved Universal Terrestrial Radio Access (E-UTRA); Packet Data Convergence Protocol (PDCP) specification", 3GPP TS 36.323 version 13.5.0, Apr. 2017, pp. 1-42.
Unknown, Author , "Discussion on L2 differentiated handling for upper layer critical data", 3GPP TSG-RAN WG2 Meeting # 98, R2-1704964, Huawei, HiSilicon, Hangzhou, China, May 15-19, 2017, 3 pages.
Unknown, Author , "Impact analysis of critical data discard on UL Video transmission and TP to address solutions for issue 4", 3GPP TSG RAN WG3 Meeting #94, R3-162790, Intel Corporation, Reno, USA, Nov. 14-18, 2016, 7 pages.

* cited by examiner

METHODS AND APPARATUS FOR DISCARDING PACKETS IN A WIRELESS COMMUNICATION NETWORK

TECHNICAL FIELD

Embodiments of the present disclosure relate to methods and apparatus in a wireless communication network, and particularly to methods and apparatus for discarding packets in a wireless communication network.

BACKGROUND

Wireless terminal devices operating in wireless communications networks are configured with a layer stack for the processing of data. In general, data packets (whether comprising control data or user data) are generated in upper layers, and passed down through the stack to the physical layer, where they are transmitted over the air interface. One or more of the layers may therefore comprise a queue or buffer of packets, which have been received from an upper layer, and which are awaiting encapsulation before being passed to a lower layer. For example, in Long Term Evolution (LTE), the packet data convergence protocol (PDCP) layer comprises such a packet queue, into which service data units (SDUs) from upper layers are stored, prior to being encapsulated in protocol data units (PDUs) and passed to a lower layer (e.g. the radio link control, RLC, layer).

Due to the delay sensitiveness of real-time communication there is a limit to how old packets can be before they cease being useful to transmit. The end-to-end delay in a real-time communication is typically confined within 500 ms to 1 s. Thus, packets that have not been transmitted for a certain period of time may be discarded by the sender, since they are too old to be reproduced by the receiver. This discarding of packets will also prevent an excessive long queue of packets being produced if the transmission rate is lower than the production rate.

An example of the operation described above is the PDCP packet discard in the PDCP layer in LTE [Section 5.4, 36.323, version 13.5.0]:

When the discardTimer expires for a PDCP SDU, or the successful delivery of a PDCP SDU is confirmed by PDCP status report or LWA status report, the UE shall discard the PDCP SDU along with the corresponding PDCP PDU. If the corresponding PDCP PDU has already been submitted to lower layers, the discard is indicated to lower layers.

Thus, according to this part of the LTE standard, each PDCP SDU is configured with a respective timer (discardTimer), which is initiated upon receipt of the SDU at the PDCP layer. When the timer expires, the corresponding SDU is discarded (either from the queue, or from lower layers if the corresponding PDU has already been submitted to lower layers).

SUMMARY

A problem with the PDCP discard is that no differentiation of packets is possible. Some data packets may be more important, or critical, than other data packets.

One example of critical data is intra frames produced by a video encoder. A video codec may produce either progressive or intra frames. A progressive frame contains updates to the previously received frames. An intra frame contains full information to produce a complete image. It may be considered that the loss of an intra frame is more critical to the video quality than the loss of a progressive frame.

A second example is control information send via a real-time transport control protocol (RTCP) in a real-time transport protocol (RTP) connection. An RTCP packet may contain information for e.g. rate adaptation, and it may be beneficial if this information is prioritized over regular RTP packets containing e.g. progressive frames as described above.

A possible solution to the problem would be to give absolute priority to a critical packet within the queue, i.e. always transmitting a critical packet first regardless of when it arrived in the queue. A problem with this is that it may be desired to allow for a short queue (within the length of the PDCP discard time) in order to fully utilize the available average transmission rate in cases of fluctuations in the radio environment. This may be accomplished by keeping also the older packets and transmitting these packets after the high-priority packet. However, this will cause out-of-order delivery which may negatively impact the performance of other transmission elements, e.g. Robust Header Compression [IETF RFC3095].

A further alternative solution would be to allow the configuration of different timer durations for different packets. For example, packets containing critical data may be configured with longer timer durations than those comprising non-critical data. In this way, critical data packets are less likely to be discarded, while still being delivered in the order of their generation. However, a problem with this approach is that packets of non-critical data arriving after a packet of critical data may be discarded, such that a receiver may be delivered a packet of critical data without receiving related packets of data that follow. This may deteriorate streaming video due to an incomplete sequence of progressive frames, for example.

Embodiments of the disclosure provide methods and apparatus, such as wireless terminal devices and network nodes (e.g. eNodeBs or gNodeBs, or servers coupled to such nodes), that alleviate one of more of the problems identified above.

In one aspect, there is disclosed a method in a node for a wireless communications network. The node comprises a packet queue storing one or more data units for encapsulation, the one or more data units being associated with respective discard timers, upon expiry of which, the associated data unit is discarded without transmission from the node. The method comprises: obtaining a first data unit for storage in the packet queue; determining a type of data carried by the first data unit; and re-determining timer values for the respective discard timers associated with the one or more data units stored in the packet queue as a function of the determined type of data carried by the first data unit.

The disclosure also includes apparatus, such as terminal devices and network nodes, non-transitory machine-readable mediums, and computer program products for performing the method outlined above.

Embodiments of the present disclosure may have the advantages of:
1. Maintaining in-order delivery of packets
2. Allowing for a short queue to compensate for short fluctuations in the available transport bit rate
3. Not producing excessive loss of packets.

Note that the discussion below focuses on a technical solution for LTE and those networks intended to meet the requirements set out for the fifth generation (5G) of wireless systems, as defined by the Next Generation Mobile Networks Alliance. However, those skilled in the art will appreciate that it is also possible to apply the methods and apparatus described herein to other networks and access technologies. In other networks, nodes and interfaces may have different names.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably.

When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal device, or user equipment (UE), it should be understood by those skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The term "node" is taken to mean a terminal device (e.g. a UE) or a network node.

The embodiments are described for real-time voice and video over LTE [GSMA IR.92 and IR.94, respectively) in LTE or LTE based systems but is equally applicable to streaming video and machine-type communication (MTC), evolved MTC (eMTC), NB-IoT etc. As an example MTC UE, eMTC UE and NB-IoT UE also called UE category 0, UE category M1 and UE category NB1. However, the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000, 5G, NR, etc. It is recalled that 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term is specified in 5G. A general description of the agreements on 5G New Radio (NR) Access Technology so far is contained in most recent versions of the 3GPP 38-series Technical Reports.

Figure 1:
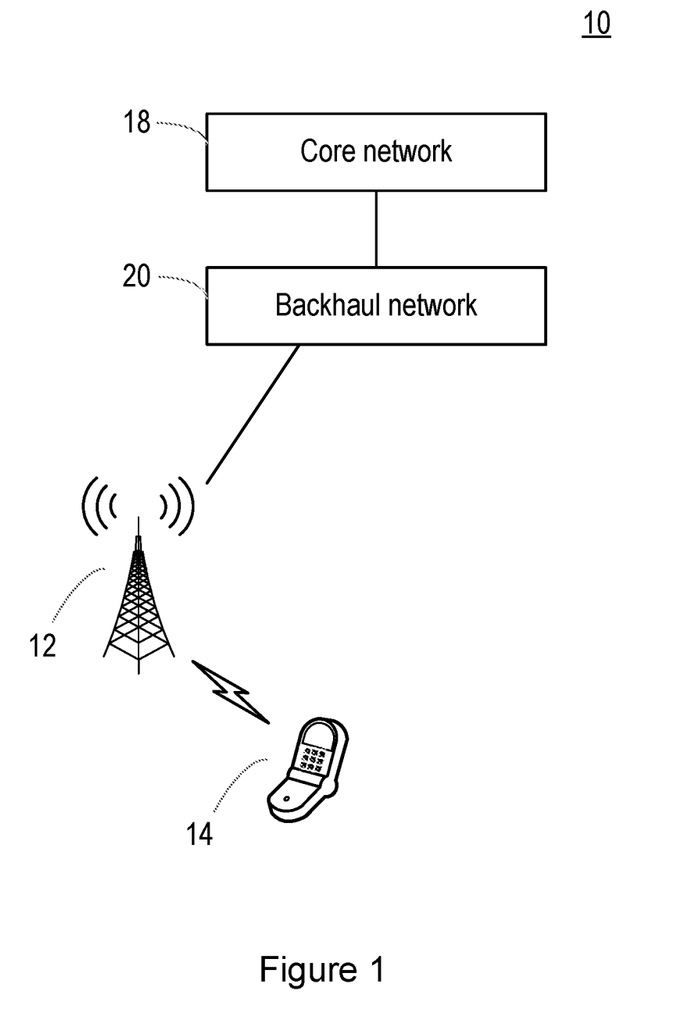
FIG. 1 shows a wireless communications network.

FIG. 1 shows a network 10 that may be utilized to explain the principles of embodiments of the present disclosure. The network 10 comprises a network node 12 which is connected, via a backhaul network 18, to a core network 20. FIG. 1 also shows a wireless terminal (or UE, etc) 14 that is in wireless communication with the network node 12.

The wireless terminal 14 is thus operable to communicate with the network 10 and particularly the network node 12. Messages transmitted by the wireless terminal 14 to the network node 12 are said to be transmitted in the "uplink" (UL), while messages transmitted by the network node 12 to the wireless terminal 14 are said to be transmitted in the "downlink" (DL).

Figure 2:
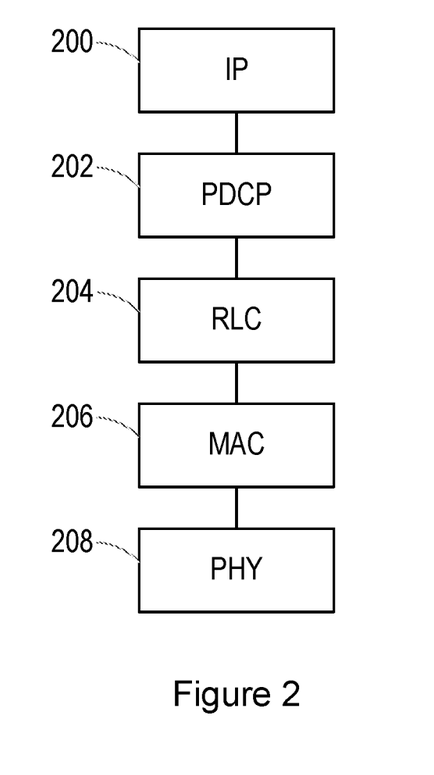
FIG. 2 illustrates a layer stack according to embodiments of the disclosure.

FIG. 2 shows a layer stack according to embodiments of the disclosure. The layer stack may be implemented within a node for a wireless communications network, such as a wireless terminal device (e.g. wireless terminal 14) or a radio access network node (e.g. network node 12). The layer stack allows for processing of data packets generated by the node, to be transmitted from the node, and for processing of data packets received wirelessly by the node.

The illustrated embodiment shows a layer stack as implemented in nodes complying with LTE standards. In other embodiments, complying with different standards, the layers of the stack may be named differently, and have different functions. Different numbers of layers may be provided to those illustrated. Those skilled in the art will appreciate that the concepts disclosed herein are applicable to any layer stack processing and, indeed, some embodiments may not require a layer stack at all. For example, the concepts disclosed herein are applicable to any node comprising a packet queue for onward transmission from the node, and to any layer comprising a packet queue for encapsulation to lower layers.

The highest layer is the internet protocol (IP) layer 200. This layer is responsible for the generation of data packets to be transmitted. For example, in one embodiment, the data packets comprise video data, with each packet comprising an intra frame or a progressive frame. In another embodiment, the data packets relate to streaming data configured according to the real-time transport protocol (RTP), or the RTP control protocol.

The IP packets are provided to the second layer in stack, the packet data convergence protocol (PDCP) layer 202. The IP packets may also be called PDCP service data units (SDUs), and the PDCP layer 202 encapsulates those PDCP SDUs into PDCP protocol data units (PDUs). The PDCP layer may also be responsible for a number of different tasks and procedures, including header compression and decompression of the IP packets. The further tasks and procedures carried out by the PDCP layer are not relevant for an understanding of the concepts disclosed herein and are not described further.

The PDCP PDUs are provided to the next lower layer, the radio link protocol (RLC) layer 204, which provides corresponding RLC PDUs to the next layer, the media access control (MAC) layer 206, and so on to the bottom layer, the physical (PHY) layer 208 for transmission over the air interface.

As noted above, the PDCP layer comprises a packet queue to which PDCP SDUs are added, prior to their encapsulation in PDCP PDUs. The rate at which PDCP SDUs are encapsulated may depend on the radio conditions experienced by the node in which the protocol stack is implemented. For example, if radio conditions are good, the PDCP SDUs may be taken from the packet queue (i.e. encapsulated as PDUs) and provided to lower layers at a relatively high rate for transmission over the air interface. In this case, the queue may be relatively short. However, if radio conditions worsen, the rate at which PDCP SDUs are taken from the queue may drop, and the queue may get longer as SDUs await encapsulation.

In order to manage the length of the queue, and ensure that packets of data which are too old to be useful are not transmitted, each PDCP SDU is associated with a discard timer. The discard timer is initiated upon receipt of the SDU by the PDCP layer 202. If the discard timer expires without transmission of the SDU from the node, the SDU is discarded. Note that the SDU may still be in the queue, in which case the SDU is discarded from the queue, or it may have been encapsulated and passed to lower layers. In the latter case, the PDCP layer 202 informs the lower layers (e.g. one or more of the RLC layer 204, the MAC layer 206 and the physical layer 208) that the discard timer has expired and the SDU (or rather its associated PDU) should be discarded without transmission from the node.

The discard timers may be implemented in any suitable manner. For example, a discard timer may count downwards from a fixed value to zero, or the discard timer may count upwards from one fixed value to another fixed value. Any reference to reducing a timer will thus be understood by the skilled person to include any method for hastening expiry of the timer.

Figure 3:
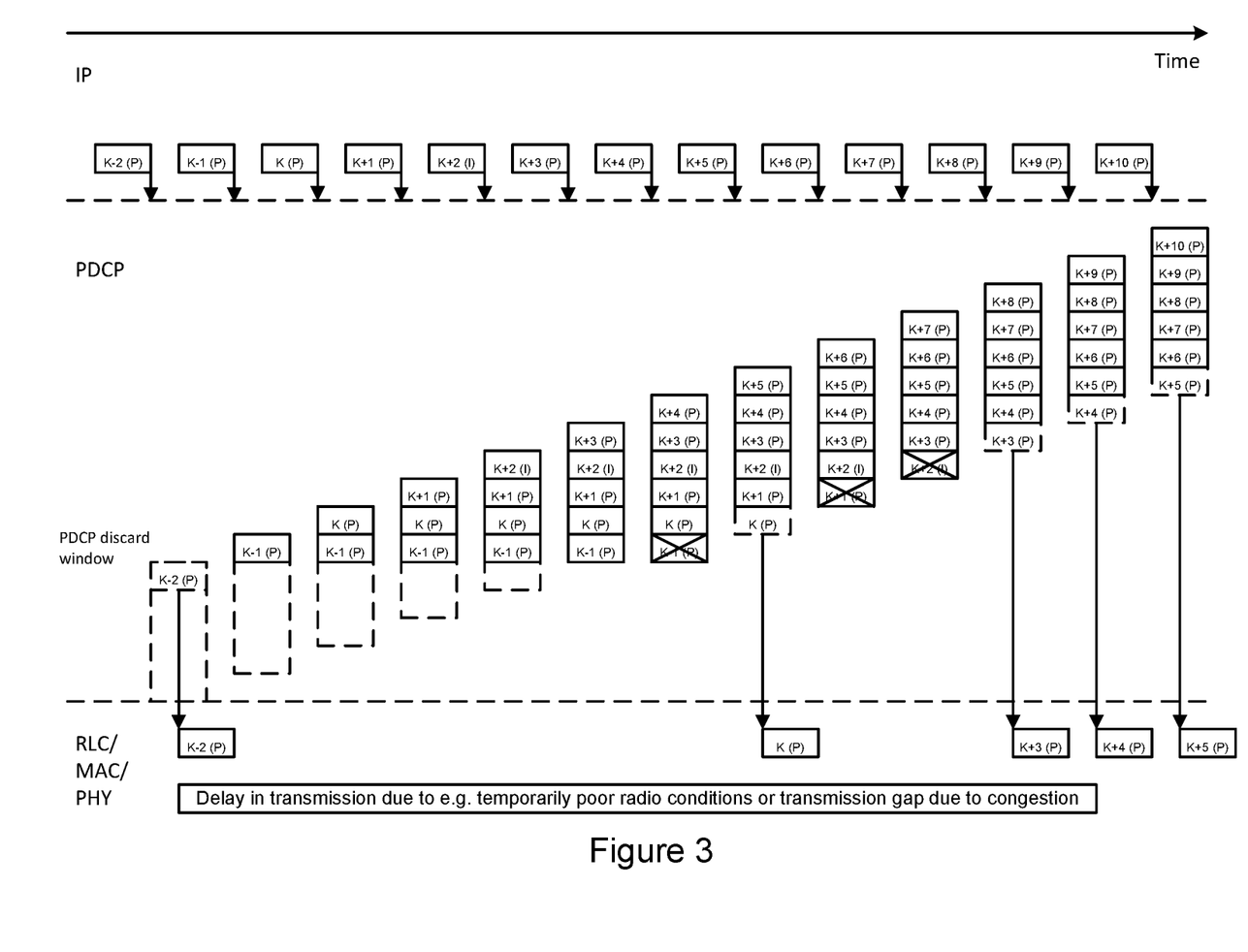
FIG. 3 is a schematic diagram showing the discard of packets according to conventional procedures.

FIG. 3 shows the conventional application of these discard timers, according to which each PDCP SDU is associated with a discard timer which is initiated to the same initial value.

Thus a stream of data packets, or data units, is received over time at the PDCP layer 202 from the IP layer 200. The stream of data units has a sequence, such that a first packet is the (K−2)th packet, a subsequent packet is the (K−1)th packet, and so on. K is an integer.

The PDCP layer stores each data unit in a packet queue, which is operated in a first-in, first-out manner. That is, data units are taken from the packet queue for encapsulation in the same order as they are received, subject to possible discard of the packets from the queue.

FIG. 3 also shows the data carried by each data unit. In the illustrated example, the data relates to video, with each data unit carrying either a progressive frame (marked with a P) or an intra frame (marked with an I).

Thus, the (K−2)th packet is received and added to the packet queue. An associated discard timer is initiated, initialized to a value which is common to all data types. However, initially radio conditions are good and the (K−2)th packet can be removed from the queue, encapsulated, and passed to lower layers for transmission from the node. On transmission from the node, the discard timer for the (K−2)th packet can be deconfigured.

A subsequent (K−1)th data packet is received and added to the packet queue. An associated discard timer is initiated, initialized to a value which is common to all data types. However, at this point the radio conditions worsen, or congestion occurs at the network (e.g. the node is unable to receive an indication of resources for transmission), and thus the (K−1)th packet remains in the queue, as subsequent packets are received.

The (K+2)th data packet carries data which relates to an intra frame of video. However, it is treated no different than the other packets (which contain a progressive frame of video).

Eventually, the discard timer for the (K−1)th packet expires without transmission of the packet from the node. The (K−1)th data packet is therefore discarded (indicated in FIG. 3 by a cross through the packet).

Conditions or congestion temporarily improve, such that the Kth packet can be transmitted from the node. However, conditions or congestion then worsen again, such that the (K+1)th and (K+2)th packets are both discarded. It will be recalled that the (K+2)th packet relates to an intra frame of video data. Conditions of congestion then improve again, and the (K+3)th, (K+4)th and (K+5)th data packets can be transmitted from the node.

Thus the packets received by a receiver, according to the conventional procedure shown in FIG. 3, are the (K−2)th, Kth, (K+3)th, (K+4)th and (K+5)th data packets. Although the units are received in order, there are significant gaps in the sequence of data, and furthermore an intra frame has been missed entirely. Therefore it can be expected that the quality of video available at the receiver will have deteriorated significantly.

In order to overcome these issues, embodiments of the present disclosure allow a node to re-calculate or re-determine discard timers that are associated with data units already present in the packet queue (and thus are already running), based on the type of data carried by a newly received data unit. For example, when a newly received data unit relates to critical data (such as an intra frame, or RTP control protocol data), and particularly when packets already in the queue are carrying less critical data, the node may be configured to reduce the discard timers associated with existing data packets. The discard timers for packets which are received subsequently, even if they relate to non-critical data, may be unaffected.

This will allow for packets that contain critical data to be prioritized in the queue, over time passing older packets with non-critical data, while ensuring that packets which are subsequent to the critical data follow in sequence.

Figure 4:
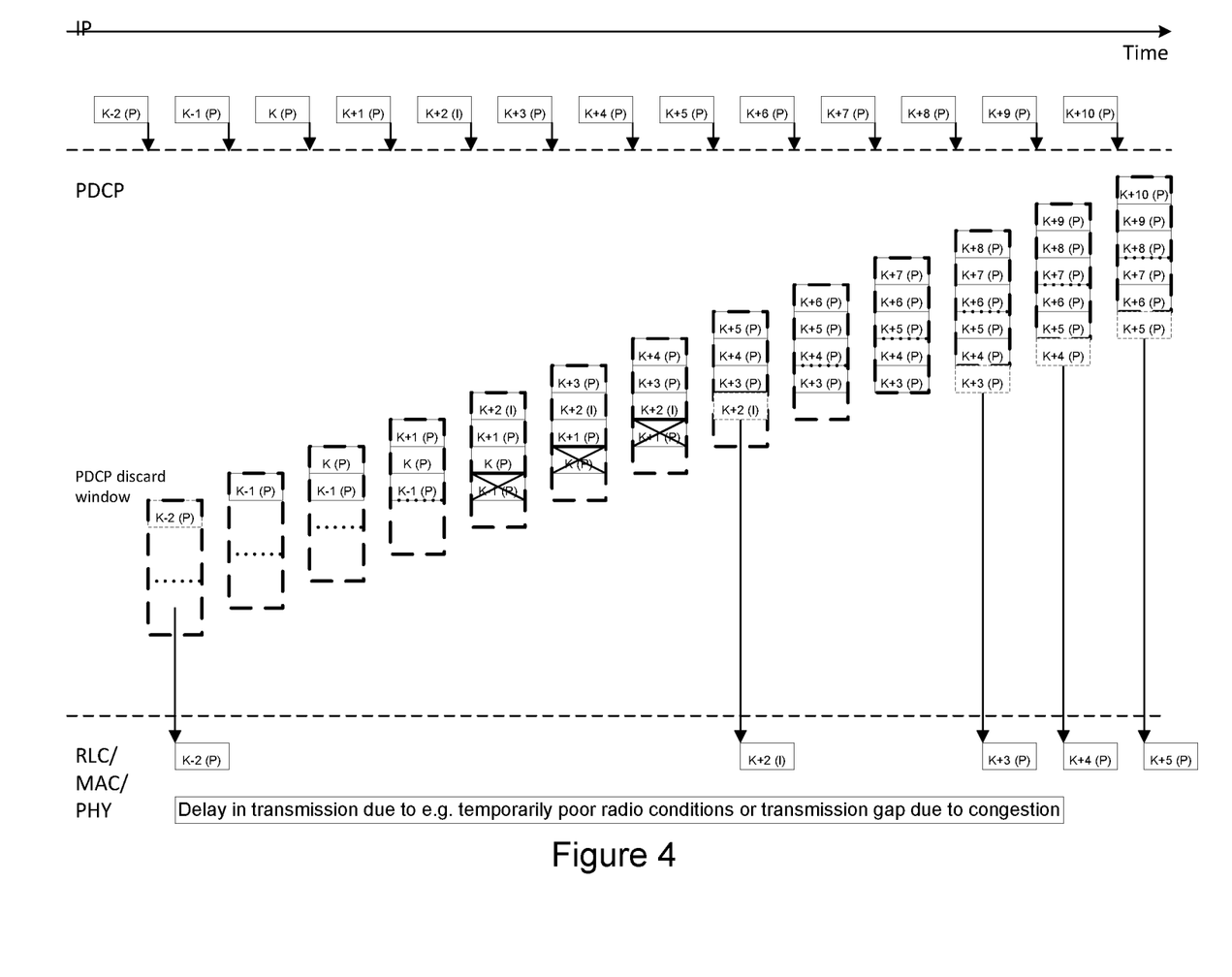
FIG. 4 is a schematic diagram showing the discard of packets according to embodiments of the disclosure.

FIG. 4 shows the application of discard timers according to embodiments of the disclosure. The drawing is similar to FIG. 3, with packets received from an upper layer in sequence. Again, the (K+2)th data packet carries more important data (e.g. an intra frame). The (K+2)th data packet may thus carry data which is associated with a higher priority level than data carried by the (K−2)th, (K−1)th, Kth and (K+1)th packets. Again, the same variation of radio conditions or congestion occurs as in FIG. 3.

Thus, the (K−2)th radio packet is transmitted as normal, and as in FIG. 3. The (K−1)th, Kth and (K+1)th packets are stored in the queue, and not transmitted due to the adverse conditions/congestion. Each of the (K−1)th, Kth and (K+1)th packets is associated with a respective discard timer which is initialized to a first value (e.g. a common value, or a value which is configured particularly for data packets carrying progressive frames of data).

Upon receipt of the (K+2)th data packet, which carries an intra frame of video data and therefore may be prioritized over data packets carrying progressive frames of video data, the discard timers associated with each of the (K−1)th, Kth and (K+1)th packets are recalculated. For example, in the illustrated embodiment, the timer values are reduced (i.e. moved closer to expiry). The reduction in the timer values may be implemented as an absolute reduction, such that each timer is reduced by an absolute amount X. In this case, any packets associated with discard timers which have values equal to X or less will be discarded.

Alternatively, the reduction in the timer values may be implemented as a relative reduction, such that each a multiplication factor is applied to the current value of each timer. Those skilled in the art will appreciate that many different implementations are possible while falling within the scope of the embodiments described herein.

Note that the discard timer associated with the (K+2)th data packet itself is not reduced. Therefore, upon reception by the PDCP layer 202, a discard timer is initiated for the (K+2)th data packet, and initialized to a particular value (e.g. the common value, or a value which is configured for data packets carrying intra frames of data).

Note however that, in some embodiments, the discard timers for packets which are received subsequent to the (K+2)th data packet are not affected. That is, only the discard timers which are currently running (i.e. associated with packets which are already in the queue or have been submitted to lower layers but not yet transmitted) are re-calculated. Subsequent data packets, even if they relate to data which has a lower priority than the (K+2)th packet, are associated with discard timers initialized to their normal values (e.g. a common value or a value which is configured for the particular type of data carried by the packet).

As the discard timers for each of the (K−1)th, Kth and (K+1)th packets are now shorter, these packets are now discarded at an earlier stage than in FIG. 3. The discard timer for the (K+2)th packet is not affected, and therefore this packet and subsequent packets remain in the queue. When radio conditions or congestion improves, the (K+2)th packet is encapsulated and transmitted from the node. When radio conditions or congestion worsens, the (K+3)th, (K+4)th packets (and so on) remain in the queue as they have relatively long discard timer values. When the conditions/congestion subsequently improve again, the (K+3)th, (K+4)th and (K+5)th data packets can be transmitted.

Thus a receiver which receives the data packets transmitted according to this scheme receives the (K−2)th, (K+2)th, (K+3)th, (K+4)th and (K+5)th data packets. These packets are all received in the order in which they were generated. The (K−1)th, Kth and (K+1)th data packets are not received, but each of these packets carries data which is associated with a relatively low priority level. Further, the (K+2)th data packet, which carries data associated with a relatively high priority level, is received by the receiver, as well as data packets which are subsequent to that packet. There may be a high likelihood that such subsequent data packets carry data which is related to the data carried in the high-priority data packet, and thus the receiver can obtain data which is coherent and complete.

Note that the embodiments described herein do not guarantee that higher-priority data packets will be delivered to a receiver. Even high-priority data packets are associated with a discard timer, and may be discarded without transmission. However, the embodiments do increase the likelihood that such packets will be transmitted, and further increase the likelihood that data packets subsequent to the high-priority data packet will also be received. The method also ensures that data is delivered in same order as it was generated.

Figure 5:
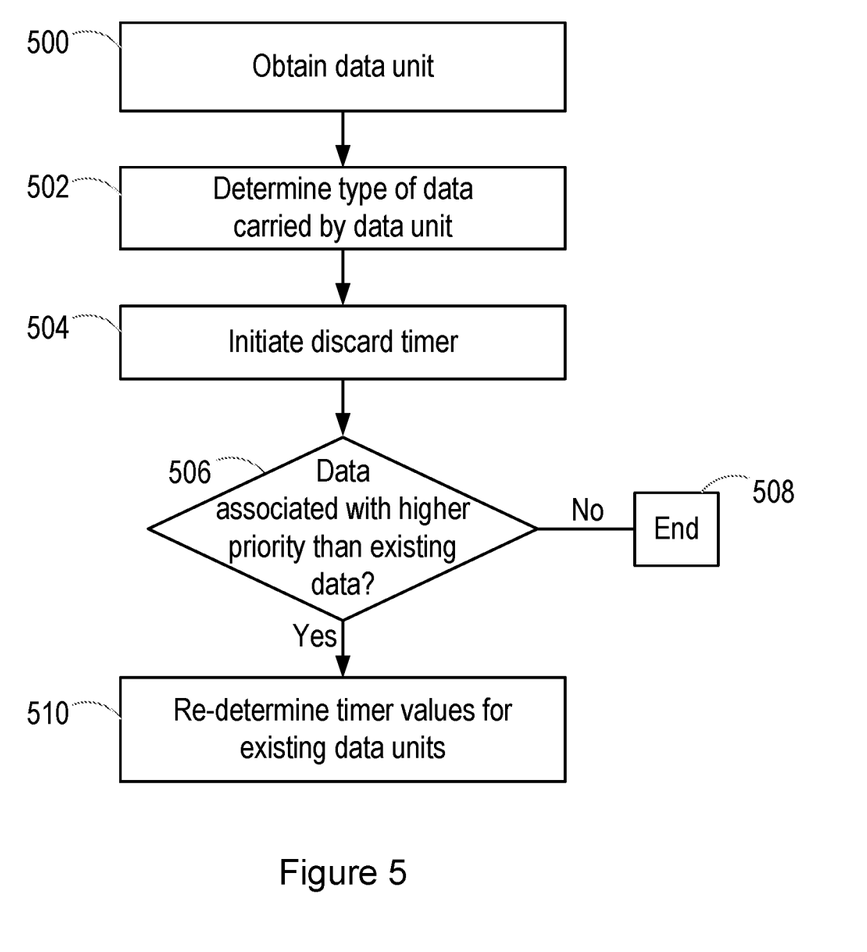
FIG. 5 is a flow chart of a method according to embodiments of the disclosure.

FIG. 5 shows a method according to embodiments of the disclosure. The method may be carried out in a node for a wireless communications network, such as a wireless terminal device (e.g. wireless terminal 14) or a radio access network node (e.g. network node 12).

In step 500, a data unit is obtained. For example, when implemented as part of a protocol stack in the node, step 500 may comprise receiving, at a first layer of the stack, a data unit from a higher layer in the stack (e.g. receiving the data unit at the PDCP layer from the IP layer). In alternative embodiments, potentially without a protocol stack, step 500 may comprise generating the data unit in the node.

As noted above, the node comprises a packet queue storing one or more data units for encapsulation (e.g. to a lower layer in a protocol stack) and/or transmission from the node. The data unit obtained in step 500 may therefore be added to the packet queue. The packet queue may be operated in a first-in, first-out manner, such that packets are generally taken from the queue in the same order that they are added to the queue. For example, the order of the packets in the queue may be based on timestamps contained within the data units, the timestamps indicating a time of generation of the data unit or a time of receipt of the data unit by the first layer in the stack.

In step 502, the node determines a type of data carried by the data unit obtained in step 500. For example, the type of data may relate to the protocol by which the data is encoded; the type of data may relate to whether the data is user data, or control data; the type of data may relate to the content of the data, such as whether the data relates to video data, audio data, user input data, or some other type of data. In a particular example, the node may determine in step 502 whether, if the data carried by the data unit is video data, the data unit comprises a progressive frame or an intra frame. In another particular example, the node may determine in step 502 whether the data carried by the data unit is user data (such as RTP data) or control data (such as RTP control protocol data).

Once the type of data is determined, this may be related to a priority level associated with the type of data. The priority level may be explicit or implicit. For example, certain types of data may be associated with a priority indication (e.g. a flag or other indication), while other types of data may not be associated with such a priority indication (e.g. no flag, or a non-asserted flag). That is, the types of data associated with a priority indication may be considered as high priority, while the types of data for which no priority indication is received may be considered as low priority. Alternatively, priority levels may be maintained for any and/or all of the data types handled by the node. In the specific examples given above, intra frames of video and control data (e.g. RTP control protocol data) may be associated with high priority, while progressive frames of video data and user data (e.g. RTP data) may be associated with low priority.

Thus, in one embodiment, two effective priority levels are configured for data types. In other embodiments, more than two priority levels may be associated with the data types. The present disclosure is not limited in this respect.

The association between the data types and the priority levels may be configured by the network, such as via signalling from another node of the network (e.g. from a radio-access network node or core network node). In the case of signalling from a radio-access network node, the signalling may be via dedicated signals (e.g. radio resource control (RRC) signalling), or broadcast (e.g. via system information blocks). Alternatively, the association between the data types and the priority levels may be determined by the node itself, or based on user configuration of the node. In these embodiments, the node may thus determine that a particular type of data (or types of data) is more important than other types of data, and autonomously associate that particular type of data with an appropriate higher priority level.

In step 504, a discard timer is initiated for the data unit obtained in step 500. When implemented using a protocol stack, the discard timer may be initiated upon receipt of the data unit by the first layer of the stack in step 500. Alternatively, the discard timer may be initiated upon storage of the data unit in the queue, or on generation of the packet by the node.

The discard timer may be initialized to a value which is common for all types of data. In such embodiments, step 504 may occur before step 502, as the initial value of the discard timer does not depend on the type of data carried by the data unit. In other embodiments, the discard timer may be initialized to a value which depends on the type of data determined in step 502. For example, the discard timer may be initialized to a value which depends on the priority level associated with the type of data determined in step 502. In such embodiments, data which is associated with a relatively high priority level may be associated with initial discard timer values that are relatively longer than the initial discard timer values for data which is associated with a relatively low priority level.

The initial timer values, whether common to all data types or specific to particular data types, may be preprogrammed in the node, or signalled to the node from another node of the wireless communications network (e.g. from a radio-access network node or core network node). In the case of signalling from a radio-access network node, the signalling may be via dedicated signals (e.g. radio resource control (RRC) signalling), or broadcast (e.g. via system information blocks). Alternatively, the timer duration may be written into the field description for the discard timers, e.g. such that a certain timer duration is applicable for high-priority or low-priority data, etc.

The method assumes that the packet queue already comprises one or more data units (i.e. data units that have been obtained previously and are thus ahead of the data unit obtained in step 500 in the queue). These existing data units are associated with respective discard timers, similar to the data unit obtained in step 500. If the discard timers for all data types are configured with the same initial value, the discard timers for these existing data units will therefore be lower than the discard timer initiated in step 504.

In step 506, the node determines whether the priority level associated with the type of data determined in step 502 is greater (higher) than the priority levels associated with the data units already in the packet queue. If not, the method ends in step 508. The data unit obtained in step 500 is thus added to the queue and associated with a discard timer which is initialized to a particular value. Older data units are taken from the queue in a first-in, first-out manner, for encapsulation and/or transmission from the node. If a discard timer expires before the associated data unit is transmitted from the node, the data unit is discarded. The data unit may be discarded directly from the queue or, if it has previously been encapsulated and passed to lower layers of the protocol stack, the lower layers may be informed of the discard.

Similarly, if the queue is empty save for the data unit obtained in step 500 (i.e. there are no existing data units already in the queue), the method also ends in step 508.

If, in step 506, the node determines that the priority level associated with the type of data determined in step 502 is greater (higher) than the priority levels associated with the data units already in the packet queue, the method moves to step 510. Step 506 may involve a determination that the priority level associated with the type of data determined in step 502 is greater (higher) than the priority levels associated with all of the data units already in the packet queue.

In step 510, the node re-determines, or re-calculates, the discard timer values for existing data units within the queue (i.e. data units that have been obtained previously and are thus ahead of the data unit obtained in step 500 in the queue). Note that only the discard timer values for existing data units within the queue may be re-determined in step 510. The timer initiated in step 504 (i.e. for the data unit obtained in step 500) may not be re-determined. Similarly, the discard timers for data units which are received subsequently to the data unit in step 500 may not be re-determined, but rather configured according to their ordinary value (whether that is common to all data types or specific to particular data types).

In one embodiment, the discard timer values for existing data units within the queue may be re-determined by reducing the timer values by an amount (i.e. moving the discard timers closer to, or beyond, their expiration point). The amount may be an absolute amount (for example, a time value X) or a relative amount (for example, a multiplication factor Y). The amount may be preprogrammed in the node, or signalled to the node from another node of the wireless communications network (e.g. from a radio-access network node or core network node). In the case of signalling from a radio-access network node, the signalling may be via dedicated signals (e.g. radio resource control (RRC) signalling), or broadcast (e.g. via system information blocks).

The amount may be the same for all types of data, or specific to particular types of data. For example, discard timers for data units carrying relatively low priority data may be reduced by a greater amount than discard timers for data units carrying relatively high priority data. This embodiment assumes that the types of data are associated with one of at least three priority levels.

Thus the discard timers for data units carrying lower-priority data are shortened, making it more likely that those data units will be discarded without transmission from the node. In embodiments where the timer values are reduced by an absolute amount, some data units (e.g. those associated with timers values that were equal to X or less) may be immediately discarded upon the re-determination in step 510. While this may reduce the number of data units transmitted by the node (and received by a receiver), the reduction in the timer values may be configured so as to only have a significant effect when network or radio conditions are bad, resulting in a relatively long packet queue. In those cases, higher-priority packets are more likely to be transmitted, and the packets which follow the higher-priority packets are also more likely to be transmitted. This will increase the quality of the data stream received at the receiver. When network or radio conditions are good, the queue should be relatively short, as packets are encapsulated and/or transmitted at a rate which is equal to or higher than the rate at which the packets are added to the queue. In that case, the reduction in the discard timer values when a high-priority data unit is added to the queue may not result in the older packets being discarded (as they may be transmitted before even the reduced timer expires).

Figure 6:
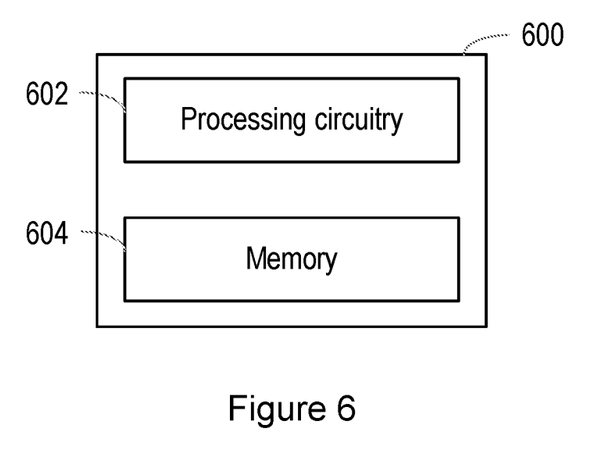
FIG. 6 is a schematic diagram of a node according to embodiments of the disclosure.

FIG. 6 is a schematic diagram of a node 600 according to embodiments of the disclosure. The node 600 may be suitable to perform the method shown in FIG. 5. The node may be a wireless terminal device (e.g. wireless terminal 14) or a radio access network node (e.g. network node 12).

The node comprises a packet queue storing one or more data units for encapsulation (e.g. to a lower layer in a protocol stack). The one or more data units are associated with respective discard timers, upon expiry of which, the associated data unit is discarded without transmission from the node 600.

The node 600 comprises processing circuitry 602 and a non-transitory machine-readable medium 604 (such as memory) which is coupled to the processing circuitry 602. The non-transitory machine-readable medium 604 comprises instructions which, when executed by the processing circuitry 602, cause the node to: obtain a first data unit for storage in the packet queue; determine a type of data carried by the first data unit; and re-determine timer values for the respective discard timers associated with the one or more data units stored in the packet queue as a function of the determined type of data carried by the first data unit.

The type of data carried by the first data unit may comprise one of: control data and user data. The user data may comprise real-time transport protocol, RTP, data, and the control data may comprise RTP control protocol data. The control data may be associated with a higher priority level than the user data.

The type of data carried by the first data unit may comprise one of: an intra frame of video data and a progressive frame of video data. The intra frame of video data may be associated with a higher priority level than the progressive frame of video data.

The node 600 may also be configured to re-determine timer values for the respective discard timers associated with the one or more data units stored in the packet queue responsive to a determination that the type of data carried by the first data unit is associated with a first priority level, and that data carried by each of the one or more data units stored in the packet queue is associated with respective priority levels which are lower than the first priority level, or is not associated with a priority level.

The association between the type of data carried by the first data unit and the first priority level may be configured by signalling (e.g. RRC signalling) from another node of the wireless communications network.

The association between the type of data carried by the first data unit and the first priority level may be determined by the node 600.

The node 600 may also be configured to re-determine timer values for the respective discard timers associated with the one or more data units stored in the packet queue by reducing the timer values by an amount. The amount may be an absolute amount. The amount may be associated with the first priority level.

The amount may be configured via signalling (e.g. RRC signalling) received from another node of the wireless communications network.

The non-transitory machine-readable medium 604 may also store code which, when executed by the processing circuitry 602, causes the node 600 to initiate a discard timer associated with the first data unit upon receipt of the first data unit.

The respective discard timers may be initialized to the same initial value upon receipt of the respective data units. The initial value may be configured via signalling (e.g. RRC signalling) received from another node of the wireless communications network.

The respective discard timers may be initialized to respective initial values dependent on the type of data carried by the associated data unit. The respective initial values may be configured via signalling (e.g. RRC signalling) received from another node of the wireless communications network.

The node 600 may also be configured to discard the first data unit by discarding the first data unit from the packet queue.

The non-transitory machine-readable medium 604 may also store code which, when executed by the processing circuitry 602, causes the node 600 to encapsulate the data units at a rate which varies as a function of radio conditions.

The packet queue may be configured in a first-in, first-out manner.

The packet queue may be provided in a first layer of a layer stack within the node. The first layer may a packet data convergence protocol, PDCP, layer. The packet queue may be associated with a first instance of the first layer. The node 600 may also be configured to obtain the first data unit by receiving the first data unit at the first layer from a higher layer in the layer stack.

The non-transitory machine-readable medium 604 may further store code which, when executed by the processing circuitry 602, causes the node 600 to encapsulate a data unit and pass the encapsulated data unit to a lower layer in the layer stack.

The node 600 may also be configured to discard a data unit by instructing a lower layer to discard the encapsulated data unit.

The node 600 may also configured to discard a data unit by discarding a data unit from the packet queue.

The node 600 may also generally comprise hardware and/or software for transmitting and receiving wireless signals, such as one or more antennas, and transceiver circuitry coupled to the one or more antennas.

Figure 7:
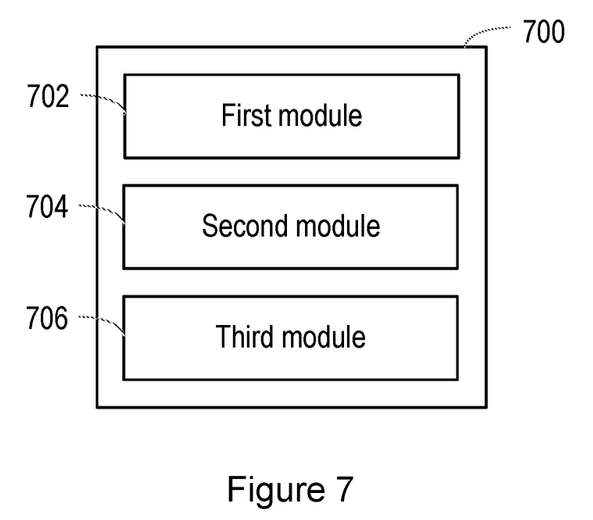
FIG. 7 is a schematic diagram of a node according to further embodiments of the disclosure.

FIG. 7 is a schematic diagram of a node 700 according to embodiments of the disclosure. The node 700 may be suitable to perform the method shown in and described with respect to FIG. 5, for example. The node may be a wireless terminal device (e.g. wireless terminal 14) or a radio access network node (e.g. network node 12).

The node 700 comprises a packet queue storing one or more data units for encapsulation (e.g. to a lower layer in a protocol stack). The one or more data units are associated with respective discard timers, upon expiry of which, the associated data unit is discarded without transmission from the node 700.

The node 700 comprises a first module 702, a second module 704, and a third module 706.

The first module 702 is configured to obtain a first data unit for storage in the packet queue. The second module 704 is configured to determine a type of data carried by the first data unit. The third module 706 is configured to re-determine timer values for the respective discard timers associated with the one or more data units stored in the packet queue as a function of the determined type of data carried by the first data unit.

The node 700 may also generally comprise one or more interface modules for transmitting and receiving signals, such as one or more antennas, and transceiver modules coupled to the one or more antennas for transmitting and receiving wireless signals.

Thus embodiments of the disclosure provide methods and apparatus in a wireless communications network that prioritize packets comprising critical, or higher-priority data, while achieving in-order delivery of packets and reducing the likelihood that packets will be discarded and lost from a useful data stream. The proposed solution introduces the possibility to apply a shorter discard timer for lower-priority packets that arrived prior to a packet containing higher-priority data, but keeping the same discard timer for packets containing lower-priority data that arrive later than the higher-priority packet. This will allow for packets that contain higher-priority data to be prioritized in the queue and over time pass the older packets with lower-priority data. The proposed solution will introduce the possibility of prioritizing packets containing critical data while still maintaining the basic operation of maintaining in-order-delivery of packets, allow for a short queue of packets to compensate for short temporal variations of the available transport bit-rate, and maintain a minimum of packet loss for the application layer.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method in a node operating in a wireless communications network, the method comprising:
   receiving sequential data units into a protocol layer of a protocol stack maintained by the node, the sequential data units to be transmitted from the node; and
   for each sequential data unit incoming to the protocol layer, adding the sequential data unit to a queue as a new data unit, and, in conjunction with adding the new data unit to the queue:
      starting a corresponding discard timer for the new data unit, such that the new data unit will be subsequently discarded without transmission, if the corresponding discard timer expires before successful transmission of the new data unit; and
      with respect to each sequential data unit that is in the queue as a queued data unit at the time of adding the new data unit to the queue, conditionally moving the corresponding discard timer of the queued data unit closer to expiry in dependence on a relative priority of the new data unit versus the queued data unit.

2. The method according to claim 1, wherein conditionally moving the corresponding discard timer of the queued data unit closer to expiry in dependence on the relative priority of the new data unit versus the queued data unit comprises moving the corresponding discard timer of the queued data unit closer to expiry in response to determining that a priority level of the new data unit is higher than a priority level of the queued data unit, or determining that the new data unit is associated with a priority level and that the queued data unit is not associated with a priority level.

3. The method according to claim 1, wherein conditionally moving the corresponding discard timer of the queued data unit closer to expiry in dependence on the relative priority of the new data unit versus the queued data unit comprises, if the new data unit has a higher priority than the queued data unit, reducing a current value of the corresponding discard timer of the queued data unit by an absolute amount, if the current value exceeds the absolute amount, and otherwise treating the corresponding discard timer of the queued data unit as being expired.

4. The method according to claim 1, wherein the node is a wireless terminal device or a radio access network node.

5. A node for a wireless communications network, the node comprising a packet queue storing one or more data units for encapsulation, the one or more data units being associated with respective discard timers, upon expiry of which, the associated data unit is discarded without transmission from the node, the node comprising processing circuitry and a non-transitory machine-readable medium storing code that, when executed by the processing circuitry, causes the node to:

receive sequential data units into a protocol layer of a protocol stack maintained by the node, the sequential data units to be transmitted from the node; and for each sequential data unit incoming to the protocol layer, add the sequential data unit to a queue as a new data unit, and, in conjunction with adding the new data unit to the queue:

start a corresponding discard timer for the new data unit, such that the new data unit will be subsequently discarded without transmission, if the corresponding discard timer expires before successful transmission of the new data unit; and with respect to each sequential data unit that is in the queue as a queued data unit at the time of adding the new data unit to the queue, conditionally move the corresponding discard timer of the queued data unit closer to expiry in dependence on a relative priority of the new data unit versus the queued data unit.

6. The node according to claim 5, wherein, to conditionally move the corresponding discard timer of the queued data unit closer to expiry in dependence on the relative priority of the new data unit versus the queued data unit, the node moves the corresponding discard timer of the queued data unit closer to expiry in response to determining that a priority level of the new data unit is higher than a priority level of the queued data unit, or determining that the new data unit is associated with a priority level and that the queued data unit is not associated with a priority level.

7. The node according to claim 6, wherein the node determines the priority levels of the new and queued data units or the priority levels are signaled from another node of the wireless communications network.

8. The node according to claim 5, wherein, to conditionally move the corresponding discard timer of the queued data unit closer to expiry in dependence on the relative priority of the new data unit versus the queued data unit, if the new data unit has a higher priority than the queued data unit, the node reduces a current value of the corresponding discard timer of the queued data unit by an absolute amount, if the current value exceeds the absolute amount, and otherwise treats the corresponding discard timer of the queued data unit as being expired.

9. The node according to claim 8, wherein the absolute amount is associated with the priority level associated with the new data unit.

10. The node according to claim 5, wherein, for each sequential data unit added as a corresponding new data unit to the queue, the node initializes the corresponding discard timer to set an expiry period of the corresponding discard timer in dependence on a priority of the corresponding new data unit or a type of data carried by the corresponding new data unit.

11. The node according to claim 5, wherein each of the sequential data units carries either control data or user data, and wherein the control data is associated with a higher priority level than the user data.

12. The node according to claim 5, wherein each of the sequential data units carries either an intra frame of video data or a progressive frame of video data, and wherein intra frames of video data are associated with a higher priority level than progressive frames of video data.

13. The node according to claim 5, wherein the non-transitory machine-readable medium further stores code which, when executed by the processing circuitry, causes the node to encapsulate the sequential data units, for passing down the protocol stack for transmission from the node, at a rate which varies as a function of radio conditions.

14. The node according to claim 5, wherein the protocol layer is a first layer of the protocol stack.

15. The node according to claim 14, wherein the first layer is a packet data convergence protocol (PDCP) layer.

16. The node according to claim 14, wherein a higher layer in the protocol stack provides the sequential data units to the first layer.

17. The node according to claim 14, wherein the first layer of the protocol stack encapsulates given ones of the sequential data units and passes the resulting encapsulated data units to a lower layer in the layer stack.

18. The node according to claim 17, wherein, to discard a given encapsulated data unit subsequent to passing the given encapsulated data unit to the lower layer, the node instructs the lower layer to discard the encapsulated data unit.

19. The node according to claim 5, wherein the node is a wireless terminal device or a radio access network node.

20. A method in a node for a wireless communications network, the node comprising a packet queue storing one or more data units for encapsulation, the one or more data units being associated with respective discard timers, upon expiry of which, the associated data unit is discarded without transmission from the node, the method comprising:

obtaining a first data unit for storage in the packet queue;
determining a type of data carried by the first data unit; and
re-determining timer values for the respective discard timers associated with the one or more data units stored in the packet queue as a function of the determined type of data carried by the first data unit;
wherein the step of re-determining timer values for the respective discard timers associated with the one or more data units stored in the packet queue is carried out responsive to a determination that the type of data carried by the first data unit is associated with a first priority level, and that data carried by each of the one or more data units stored in the packet queue is associated with respective priority levels that are lower than the first priority level, or is not associated with a priority level.

* * * * *